UNITED STATES PATENT OFFICE 2,680,671

METHOD OF TREATING CYCLONITE MIXTURES

Werner E. Bachmann, Ann Arbor, Mich., assignor to the United States of America as represented by the Secretary of War No Drawing. Application July 16, 1943,
Serial No. 495,079

3 Claims. (Cl. 23—103)

The present invention relates to the preparation of high explosives, and more particularly to a new and improved method of working up the reaction mixture resulting from the manufacture of cyclonite by the so-called "combination process."

In my copending application, Serial No. 495,078, filed of even date herewith, there is described a method of preparing cyclonite, which involves the treatment of a hexamine compound (e. g., hexamine or one of its salts) with an ammonia donor and nitric acid in the presence of an anhydride of a volatile fatty acid, such as acetic anhydride. In one of its preferred embodiments, the process proceeds according to the overall equation:

$$\text{Hexamine} + 4HNO_3 + 2NH_4NO_3 + 6(CH_3CO)_2O =$$
$$2 \text{ cyclonite} + 12CH_3COOH$$

In this so-called "combination process," there is obtained a reaction mixture which contains crude cyclonite in the form of a sandy crystalline solid in a mother liquor. The mother liquor contains volatile fatty acid, residual nitric acid and ammonium nitrate together with certain reaction by-products the exact nature of which are not clearly understood at the present time. These by-products may lower the melting point of the crude cyclonite and interfere with any recovery operation on the mother liquor. Thus, if an attempt is made to distill the volatile fatty acid from the separated mother liquor, it has been found that an oily-to-gummy by-product separates during the distillation, and this by-product renders the recovery operation hazardous because of the sensitivity of ammonium nitrate mixtures containing organic material.

One of the objects of the present invention is to provide a new and improved process of working up the reaction mixture resulting from the manufacture of cyclonite by the "combination process," whereby the quality of the resulting cyclonite may be improved.

Another object is to provide a method of recovering volatile fatty acid from the mother liquor, which obviates the separation of an oily-to-gummy reaction product.

A further object is to provide a process of recovering the nitrogen contained in said mother liquor, either in the form of ammonium nitrate or in the form of ammonia.

Other objects and advantages will be apparent as the invention is hereinafter more fully described.

It has been found that the foregoing objects may be accomplished in accordance with the present invention by digesting the reaction mixture resulting from the foregoing cyclonite-producing process, at an elevated temperature and in the presence of water, for a period of time sufficient to convert to water-soluble and volatile products, the oily-to-gummy reaction by-product which normally separates on evaporation of the mother liquor. The digestion step may be carried out on the diluted reaction mixture, or on the filtrate, either before or after the nitric acid content thereof has been neutralized. However, inasmuch as the oily-to-gummy reaction by-product appears to be converted more rapidly to water-soluble and volatile products when the digestion step is carried out in the presence of a strong mineral acid such as the residual nitric acid usually contained in the mother liquor, it is preferred to digest the unneutralized mother liquor.

The time required for the digestion step will vary somewhat, depending upon the temperature of the digestion, the quantity of by-product present in the reaction mixture, the presence or absence of strong mineral acid in the material undergoing treatment, and other factors. In most instances, however, a period of about one hour is generally satisfactory when the digestion is carried out at about 90 to 100° C. on the unneutralized reaction mixture. The digestion procedure may be continued for at least as long as 24 hours at 90 to 100° C. without bringing about any noticeably deleterious effect on cyclonite or on the subsequent recovery operations. It is therefore apparent that the time of digestion need not be rigidly controlled, provided, of course, that the treatment is carried out for a period sufficient to convert the undesirable by-products to water-soluble and volatile materials.

After the reaction mixture has been digested in the manner described above, the solid (cyclonite) is separated from the mother liquor. Thereafter, the volatile fatty acid may then be separated from the non-volatile material in the filtrate, for example, by distillation, which may be effected at reduced pressure. If desired, the separation of the volatile fatty acid may be carried out immediately after digestion and removal of the cyclonite. However, I prefer to neutralize the nitric acid (but not the acetic acid) contained in the digested mother liquor, before distilling the fatty acid so that the recovered fatty acid is substantially free of nitric acid. To effect this partial neutralization, any suitable alkaline-reacting material, well known in the prior art, may be employed, the end point for the addition of the alkaline material being determined by any convenient method, for example, by using a thymol sulfonphthalein indicator where ammonium hydroxide is the alkali. It will, of course, be apparent that other well known equivalent alkaline materials may be employed in lieu of the ammonium hydroxide and any equivalent end point indicator for the neutralization of the nitric (but not the organic) acid may also be substituted for the thymol sulfonphthalein.

If it is desired to recover the nitrogen from the residue remaining after the fatty acid has been distilled, either of two alternatives may be employed. In one of these, the nitrogen is recovered as ammonium nitrate, this being accomplished by forming an aqueous solution of the residue, filtering the aqueous solution to separate any insoluble material, and then evaporating the filtrate to dryness. If a purer form of ammonium nitrate is desired, the crude ammonium nitrate may then be digested with an organic solvent in which the ammonium nitrate is insoluble, for example, glacial acetic acid, and thereafter filtering the ammonium nitrate from the organic solvent. It will be apparent that the glacial acetic acid may be replaced by any suitable organic solvent in which the ammonium nitrate is not appreciably soluble but which has an appreciable solvent capacity for organic material.

A second method of recovering the nitrogen is to treat the ammonium nitrate-containing residue with a strong alkali for the purpose of liberating the available ammonia therefrom. The liberated ammonia may then be recovered by any well-known ammonia recovery system, for example, by solution in water. The alkali metal nitrate by-product of this recovery scheme may be used as a fertilizer. Inasmuch as the presence of small amounts of organic material in a composition containing ammonium nitrate may result in the formation of a sensitive explosive of great power, the latter method of procedure is regarded as less hazardous for large scale manufacture.

In order more clearly to disclose the nature of the present invention, a preferred embodiment thereof will now be described. It should clearly be understood, however, that this is done solely by way of example and is not to be construed as a limitation upon the spirit or scope of the appended claims.

*Example*

In this example, the reaction mixture was obtained from the manufacture of cyclonite by a "combination process" wherein a hexamine compound, (e. g., hexamine itself or one of its salts such as the acetate, mononitrate or dinitrate) was treated at a temperature above about 35–40° C. with an ammonia donor (ammonium nitrate) and nitric acid in the presence of a volatile fatty acid anhydride (acetic anhydride). A process of this character is more particularly described and claimed in my above identified copending application, to which reference may be had for a detailed description thereof. For purposes of illustration, however, it will be assumed that the reaction mixture results from the treatment of 1 mole of hexamine with approximately 3 moles of ammonium nitrate and 5 moles of nitric acid in the presence of 7 moles of acetic anhydride, the reaction temperature being maintained between about 60°–75° C. The foregoing illustrative method will serve as an example of the type of process to which the present invention relates.

The reaction mixture produced by the foregoing process contains cyclonite in the form of a sandy white crystalline product in a supernatant liquid. If desired, a first crop of cyclonite may be separated from the mother liquor prior to dilution, or the single-crop resulting upon dilution may be separated prior to the digestion step in the recovery operation. This, however, is not necessary inasmuch as cyclonite is not detrimentally affected by the digestion. Indeed, digestion may improve the quality and filterability of the cyclonite, and therefore the solid is preferably separated after (rather than before) the digestion.

The reaction mixture, without neutralization of the nitric acid and preferably without separation of cyclonite, is diluted with water to any suitable concentration, for example, to about 30% to 40% acetic acid concentration, and then warmed on the steam bath (e. g., 90–100° C. inside flask), using a reflux condenser. The period of digestion may be varied from one to twenty-four hours. During this period, formaldehyde is evolved from the mixture. The mixture is then allowed to cool, the cyclonite filtered, the nitric acid (but not the acetic acid) in the filtrate neutralized with ammonium hydroxide (using thymol sulfonphthalein as an indicator) and the thus treated filtrate distilled at reduced pressure (e. g. 15 mm. at 45–60° C.). The distillate consists of dilute acetic acid which may be converted to glacial acetic acid by any method well known in the art, for example, by azeotropic distillation, using ethyl acetate.

The residue in the distilling vessel (crude ammonium nitrate) is soluble in a relatively small amount of water except for a small amount of solid. No sticky gum is found, this having been destroyed by the digestion operation. The water solution of the pot contents is filtered and the filtrate evaporated to dryness. This material yields pure white ammonium nitrate on digestion with half its weight of glacial acetic acid and washing with glacial acetic acid. In a run in which 50 grams of ammonium nitrate was used in the original cyclonite-forming process, 19.5 grams of perfectly colorless ammonium nitrate (M. P. 164–6°) was recovered in the foregoing manner. The ammonium nitrate from several such runs was used in an actual run in the preparation of further amounts of cyclonite and gave satisfactory results.

In the foregoing detailed description of the present invention, it will be apparent that many variations may be made without departing from the spirit and scope theeref. Thus for example, the process of the present invention may be applied to the mother liquid resulting from a two-crop isolation procedure wherein the reaction mixture is filtered hot from the separated first-crop cyclonite, the filtrate then diluted with water to precipitate a second crop of less pure cyclonite and the resulting reaction mixture digested in the manner described above. Many other modifications and variations will be readily apparent to those skilled in the art. It should therefore be understood that the present invention is restricted only in accordance with the following patent claims.

I claim:

1. The process of recovering cyclonite in the form of a white crystalline product from a reaction mixture containing by-products which normally separate as oily-to-gummy bodies, said mixture being obtained by heating 1 mol of a hexamine compound selected from the group consisting of hexamine, hexamine acetate, hexamine mononitrate and hexamine dinitrate with approximately 3 mols of ammonium nitrate and 5 mols of nitric acid in the presence of 7 mols of acetic acid anhydride, the reaction temperature being maintained between about 60–75° C., which consists of diluting said reaction mixture with water to about 30–40 per cent acetic acid concentration and then digesting at 90–100° C. from one to twenty-four hours as necessary to convert said oily-to-gummy bodies to water soluble and volatile products, cooling and removing the cyclonite by filtration.

2. The method of recovering acetic acid anhydride from the reaction mixture of claim 1 which consists of neutralizing the filtrate after the cyclonite has been removed with ammonium hydroxide using thymol sulfonphthalein as an indicator and distilling at 45–60° C. and 15 mm. pressure.

3. The method of recovering pure white ammonium nitrate from the reaction mixture of claim 2 which consists of forming an aqueous solution of the residue remaining from the distillation step, filtering to separate insoluble material and evaporating the filtrate to dryness and then digesting with glacial acetic acid in an amount equal to one half the weight of said dry filtrate, filtering and washing with glacial acetic acid.

References Cited in the file of this patent

UNITED STATES PATENTS

| Number | Name | Date |
|---|---|---|
| 2,208,934 | Meissner | July 23, 1940 |
| 2,410,699 | Wyler | Nov. 5, 1946 |

FOREIGN PATENTS

| Number | Country | Date |
|---|---|---|
| 670,921 | Germany | 1937 |